US011070348B1

(12) United States Patent
Huang et al.

(10) Patent No.: US 11,070,348 B1
(45) Date of Patent: Jul. 20, 2021

(54) TIME SYNCHRONIZATION OF A WIRELESS NETWORK

(71) Applicant: Facebook, Inc., Menlo Park, CA (US)

(72) Inventors: Po-Han Huang, Los Angeles, CA (US); Krishna Gomadam, San Jose, CA (US); Brian Dunn, Menlo Park, CA (US); Anubhav Singla, Fremont, CA (US); Fan Sun, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/716,224

(22) Filed: Dec. 16, 2019

(51) Int. Cl.
*H04W 56/00* (2009.01)
*H04L 7/00* (2006.01)
*H04L 12/733* (2013.01)
*H04B 7/06* (2006.01)
*H04W 72/04* (2009.01)
*H04W 24/08* (2009.01)
*H04L 12/18* (2006.01)
*H04W 40/02* (2009.01)
*H04J 3/06* (2006.01)

(52) U.S. Cl.
CPC ......... *H04L 7/0008* (2013.01); *H04B 7/0617* (2013.01); *H04J 3/0679* (2013.01); *H04L 7/0016* (2013.01); *H04L 12/189* (2013.01); *H04L 45/20* (2013.01); *H04W 24/08* (2013.01); *H04W 40/02* (2013.01); *H04W 56/001* (2013.01); *H04W 72/0446* (2013.01)

(58) Field of Classification Search
CPC .... H04W 56/001; H04W 40/02; H04J 3/0579
See application file for complete search history.

(56) References Cited

U.S. PATENT DOCUMENTS

| 8,345,660 | B2 | 1/2013 | Filoso et al. | |
|---|---|---|---|---|
| 8,767,705 | B2 | 7/2014 | Goppner et al. | |
| 2003/0117991 | A1 | 6/2003 | Beyer et al. | |
| 2005/0063383 | A1* | 3/2005 | Wisler | H04J 3/0664 370/389 |
| 2008/0165761 | A1* | 7/2008 | Goppner | H04W 56/001 370/350 |
| 2008/0205294 | A1* | 8/2008 | Brune | H04J 3/0641 370/254 |
| 2009/0290572 | A1* | 11/2009 | Gonia | H04J 3/0641 370/350 |
| 2010/0034239 | A1* | 2/2010 | Keshavarzian | H04B 1/7156 375/134 |

(Continued)

*Primary Examiner* — Gary Mui
(74) *Attorney, Agent, or Firm* — Brian R. Short (57) ABSTRACT

Apparatuses, methods, and systems for synchronizing nodes of a wireless network are disclosed. One method includes identifying synchronization paths between synchronization reference nodes of the wireless network and each non-reference node of the wireless network, wherein each synchronization path includes one or more wireless hops between the synchronization reference nodes and the non-reference node, determining a number of timing slots needed for supporting each of the identified synchronization paths, and selecting at least one of the synchronization paths between each non-reference node and at least one of the synchronization reference nodes based on a number of wireless hops of each of the identified synchronization paths and the determined number of timing slots needed to support each of the identified synchronization paths.

18 Claims, 11 Drawing Sheets

(56) References Cited

U.S. PATENT DOCUMENTS

| | | | |
|---|---|---|---|
| 2012/0134455 A1* | 5/2012 | Wang | H04W 56/0015 375/354 |
| 2013/0121351 A1* | 5/2013 | Miyabe | H04J 3/0667 370/503 |
| 2016/0112090 A1* | 4/2016 | Mason, Jr. | H04B 7/2628 375/134 |
| 2017/0055236 A1 | 2/2017 | Levesque et al. | |
| 2017/0105185 A1* | 4/2017 | Chen | G01S 1/024 |
| 2017/0353259 A1* | 12/2017 | McCormick | H04L 1/002 |
| 2018/0220395 A1* | 8/2018 | Yu | H04W 48/00 |
| 2019/0020463 A1* | 1/2019 | Xu | H04L 7/0008 |
| 2019/0053173 A1* | 2/2019 | Thong | H04W 56/001 |
| 2019/0349073 A1* | 11/2019 | Regunathan | H04B 7/2041 |
| 2020/0213867 A1* | 7/2020 | Nemavat | H04W 80/02 |
| 2020/0403901 A1* | 12/2020 | Sugiyama | H04J 3/0679 |

\* cited by examiner

TIME SYNCHRONIZATION OF A WIRELESS NETWORK

FIELD OF THE DESCRIBED EMBODIMENTS

The described embodiments relate generally to wireless networks. More particularly, the described embodiments relate to systems, methods and apparatuses for time synchronization of a wireless network.

BACKGROUND

Some wireless networks operate or operate more efficiently when nodes of the wireless networks are time synchronized.

It is desirable to have methods, apparatuses, and systems for time synchronization of a wireless network.

SUMMARY

An embodiment includes a method of synchronizing nodes of a wireless network. The method includes identifying synchronization paths between one or more synchronization reference nodes of the wireless network and each non-reference node of the wireless network, wherein each synchronization reference node receives a synchronization signal or is designated as a source of the synchronization signal, and each non-reference node does not directly receive the synchronization signal and is not designated as a source of the synchronization signal, wherein each synchronization path includes one or more wireless hops between the synchronization reference nodes and the non-reference node, determining a number of timing slots needed for supporting each of the identified synchronization paths, and selecting at least one of the synchronization paths between each non-reference node and at least one of the synchronization reference nodes based on a number of wireless hops of each of the identified synchronization paths and the determined number of timing slots needed to support each of the identified synchronization paths.

Another embodiment includes a wireless network. The wireless network includes a plurality of synchronization reference nodes, a plurality of non-reference nodes, and a controller. For an embodiment, the controller operates to identify synchronization paths between one or more synchronization reference nodes of the wireless network and each non-reference node of the wireless network, wherein each synchronization reference node receives a synchronization signal or is designated as a source of the synchronization signal, and each non-reference node does not directly receive the synchronization signal and is not designated as a source of the synchronization signal, wherein each synchronization path includes one or more wireless hops between the synchronization reference nodes and the non-reference node, determine a number of timing slots needed for supporting each of the identified synchronization paths, and select at least one of the synchronization paths between each non-reference node and at least one of the synchronization reference node based on a number of wireless hops of each of the identified synchronization paths and the determined number of timing slots needed to support each of the identified synchronization paths.

Other aspects and advantages of the described embodiments will become apparent from the following detailed description, taken in conjunction with the accompanying drawings, illustrating by way of example the principles of the described embodiments.

DESCRIPTION

The embodiments described include methods, apparatuses, and systems for time synchronization of a wireless network. Situations can arise in which some nodes of a plurality of nodes of a wireless mesh network are not able to directly receive a synchronizing clock signal. However, wireless communication between the nodes of the wireless mesh network needs the nodes to be commonly synchronized. At least some embodiments include selecting time-synchronization paths between nodes that are able to receive the synchronizing clock signal (synchronization reference nodes) and nodes that are not able to properly receive the synchronizing clock signal (non-reference) nodes. The synchronization reference nodes broadcast synchronizing clock signal information through the selected time-synchronization paths, thereby allowing the non-reference nodes to synchronize themselves to the synchronization reference nodes through the synchronizing clock signal information received through the selected time-synchronization paths.

While the nodes are depicted as being physically separate, it is to be understood that a node may include multiple different radios that are operable to communicated over different frequency channels. That is, for an embodiment, a node includes multiple radios. For another embodiment, each radio of a node may operate as a node that is wire connected to another node (other radio), and wirelessly connected to another radio (node).

For at least some embodiments, none of the nodes physically receive a synchronization clock. As will be described, in this situation, for an embodiment, a central controller designates or identifies at least one of the nodes to serve as the synchronization source or time reference for the rest of the wireless mesh network.

One or more synchronization nodes of the wireless mesh network operate as the source of timing throughout the network, either by direct reception of a synchronization source (for example, through reception of reference GPS (global positioning system) or PTP (precision time protocol) or by being designated as the timing reference). The synchronization reference nodes then propagate a synchronization signal through the wireless mesh network to the non-reference nodes, thereby synchronizing the nodes of the wireless mesh network.

Figure 1:
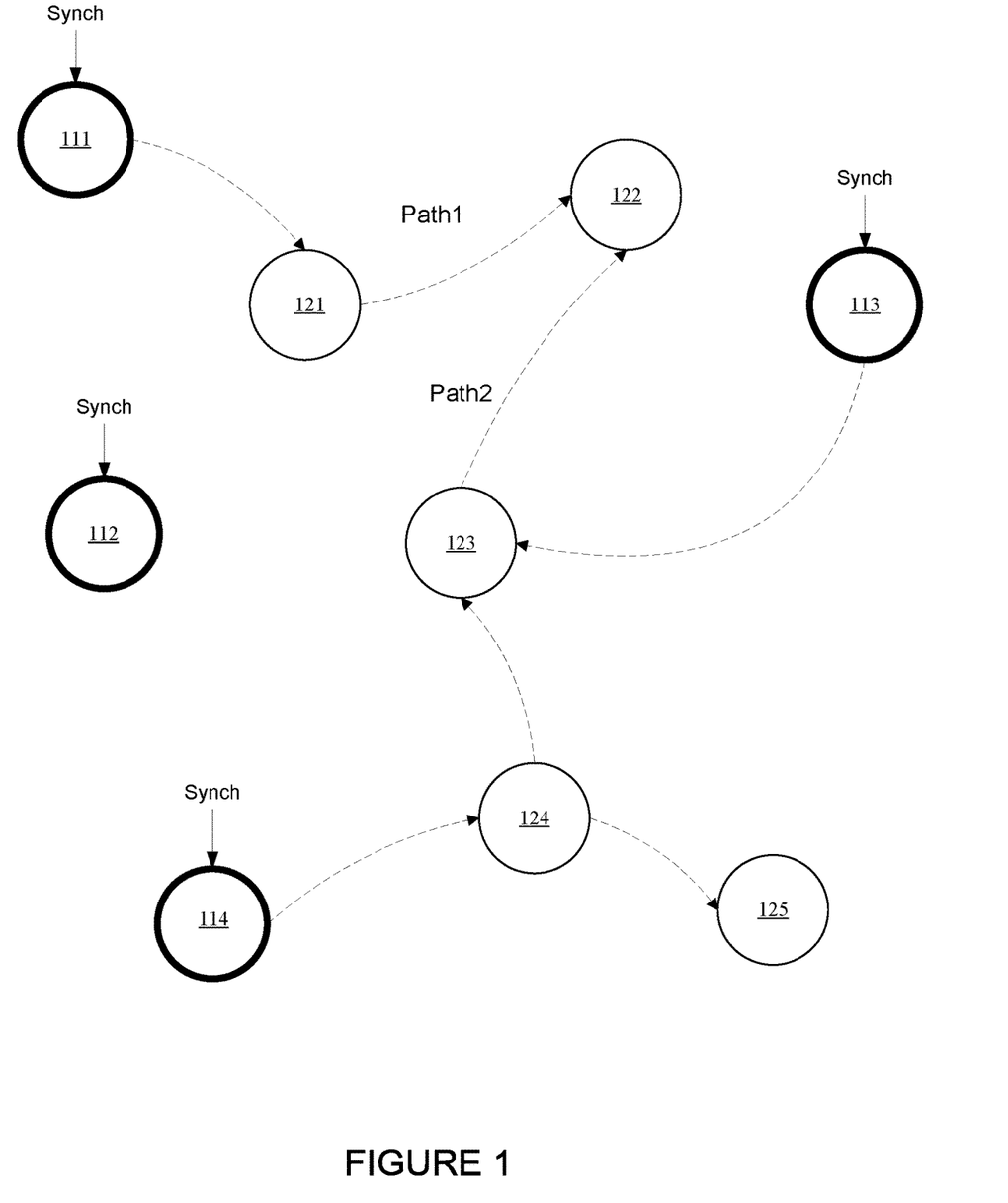
FIG. 1 shows a wireless mesh network that includes synchronizing reference nodes and non-reference nodes, according to an embodiment.

FIG. 1 shows a wireless mesh network that includes synchronization reference nodes 111, 112, 113, 114, and non-reference nodes 121, 122, 123, 124, 125, according to an embodiment. For an embodiment, the synchronization reference nodes 111, 112, 113, 114 are able to receive or generate a synchronizing clock signal. For an embodiment, the non-reference nodes 121, 122, 123, 124, 125 are not able to directly receive the synchronizing clock signal or are not designated as a timing reference. One or more of the non-reference nodes 121, 122, 123, 124, 125 may be located indoor or somewhere else that a GPS signal cannot be received.

Figure 2:
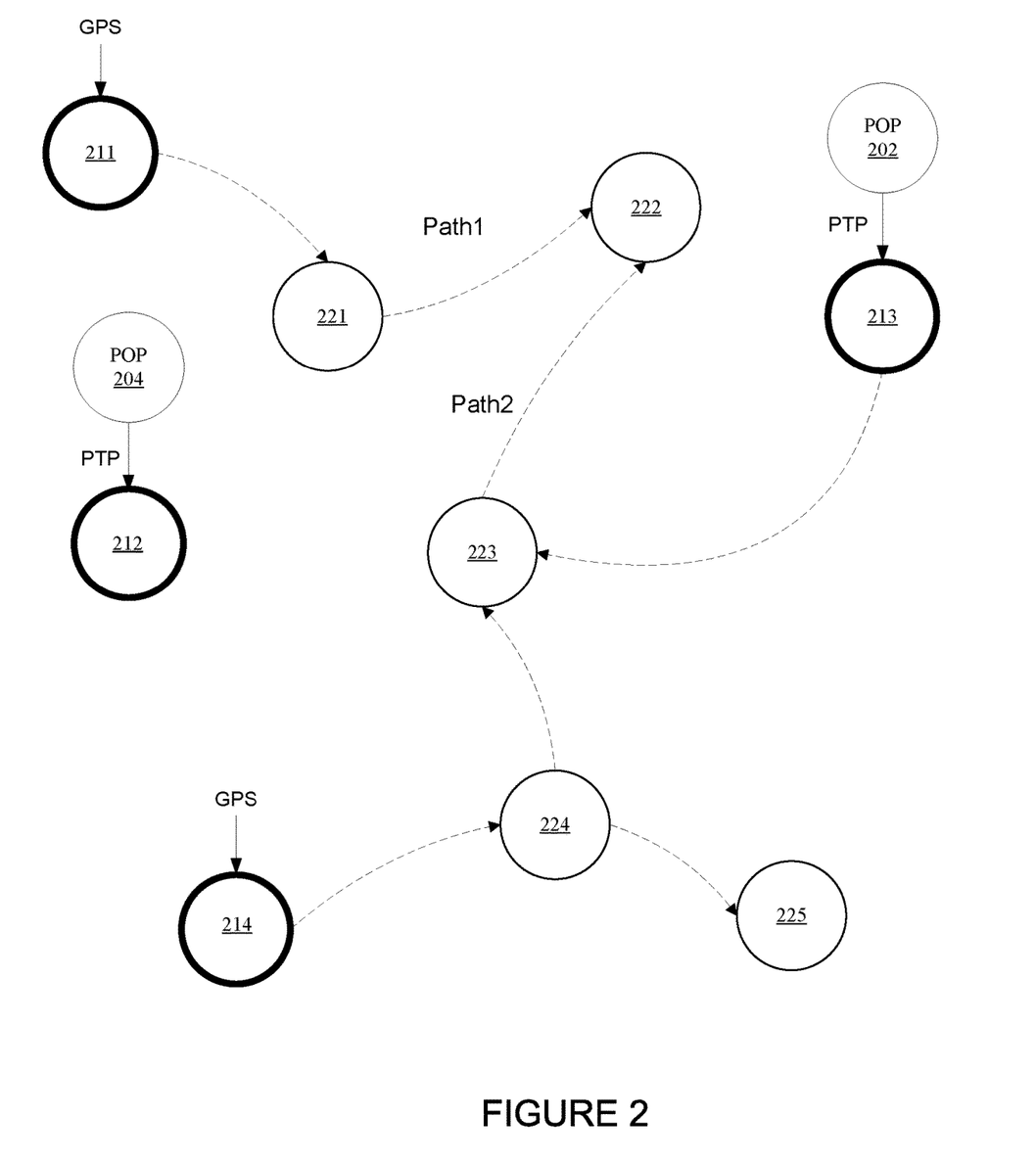
FIG. 2 shows a wireless mesh network wherein synchronizing reference nodes include a combination of POP (point of presence) and GPS (global positioning system) connected nodes, according to an embodiment.

FIG. 2 shows a wireless mesh network wherein synchronizing reference nodes include a combination of POP (point of presence) and GPS (global positioning system) connected nodes, according to an embodiment. For an embodiment, the synchronizing clock signal is a GPS (global positioning system) clock signal received from GPS satellites. For an embodiment, the synchronizing clock signal is included within a packet-based protocol of a PTP time source received from a POP (point of presence) connected to one or more of the synchronization reference nodes. For an embodiment, the synchronization reference nodes are the nodes 212, 213 that receive either the PTP time source from the POP 202, 204, or are nodes 211, 214 that directly receive a GPS signal.

The PTP time sources and/or the GPS signals provide a reference clock that the synchronization reference nodes 211, 212, 213, 214 use as a reference clock. Once synchronized to the references clock, the synchronization reference nodes 211, 212, 213, 214 communicate a synchronization signal to each of the non-reference nodes 221, 222, 223, 224, 225 through the selected at least one of the synchronization paths. After the synchronization signal has been propagated through the synchronization paths to the non-reference nodes of the wireless network, the nodes of the wireless network can properly communicate data from node to node.

For at least some embodiments, the synchronization reference nodes that receive a global time reference (either the PTP time source of the GPS signal) is selectable. That is, which nodes have a GPS receiver, which nodes have a wired connection to the internet (POP nodes) and are able to receive timing through a packet-based timing protocol, or some combination of both is selectable. The more synchronization reference nodes included within the wireless mesh network, the easier it is to maintain synchronization between nodes of the wireless mesh network. However, there is a cost versus performance tradeoff. That is, the more synchronization reference nodes that receive the global time reference, the better the wireless network can perform. However, the cost of implementing and operating the wireless network goes up with the number of synchronization reference nodes.

For an embodiment, the designated synchronization reference nodes may change over time as, for example, as GPS signal or PTP references are lost or are newly obtained. Once the designated synchronization reference nodes change, the synchronization path selections can adaptively change as well to accommodate for the new/different synchronization reference nodes. An embodiment includes reselecting the synchronization paths upon sensing a change in the synchronization reference nodes. Further, an embodiment includes reselecting the synchronization paths upon sensing a change in the non-reference nodes. Further, an embodiment includes reselecting the synchronization paths upon sensing a change in the quality of the wireless links (wireless hops) between the nodes of the wireless mesh network.

At least some embodiments include adaptively selecting the synchronization reference nodes, and/or adaptively selecting a type of synchronization reference nodes. For an embodiment, the type of synchronization node (that is, a GPS reference node, a PTP reference node, or a single reference node) is adaptively selected. For an embodiment, the number and types of synchronization nodes is adaptively selected based on a level of accuracy (level of time synchronization). For an embodiment, fewer synchronization reference nodes are selected when higher accuracy GPS receivers are used for receiving GPS signals. That is, the greater the time accuracy of the synchronization signal the fewer the number of synchronization reference nodes needed. That is, the number of synchronization reference nodes selected is based on the timing accuracy of the synchronization reference nodes. For an embodiment, a number of GPS synchronization reference nodes are selected where possible, and remaining synchronization reference nodes needed or required are selected as PTP synchronization reference nodes when the number of GPS synchronization reference nodes is not sufficient.

As described, at least some embodiments include identifying synchronization paths between each synchronization reference nodes of the wireless network and each non-reference node of the wireless network, wherein each synchronization reference nodes receives a synchronization clock, and each non-reference node does not directly receive the synchronization clock, wherein each synchronization path includes one or more wireless hops between the synchronization reference nodes and the non-reference nodes. For example, as shown in FIG. 1, a synchronization path (Path 1) is identified between the synchronization reference node 111 and the non-reference nodes 122. Further, another synchronization path (Path 2) is identified between the synchronization reference node 114 and the non-reference node 122. The synchronization paths can be identified by determining which of the nodes of the wireless mesh network are able to communicate with each other, and then determining paths based on the determination of nodes of the wireless mesh network are able to communicate with each other.

As can be observed, the synchronization path (Path 1) includes two wireless hops (a hop between synchronization reference node 111 and non-reference node 121, and a hop between non-reference node 121 and non-reference node 122). Further, as can be observed, the synchronization path (Path 2) includes three wireless hops (a hop between synchronization reference node 114 and non-reference node 124, a hop between non-reference node 124 and non-reference node 123, and, a hop between non-reference node 123 and non-reference node 122). At least some embodiments include selecting the synchronization path as the path between a synchronization reference node and non-reference nodes that includes the least number of wireless hops.

At least some embodiments include determining a number of timing slots needed for supporting each of the identified synchronization paths. That is, a time slot is required to communicate information between each node through each link (hop) of a path. For an embodiment, one or more of the nodes includes an array of antenna which can form beam patterns that include one or more directional beams. As will be described, for at least some embodiments, a beam forming pattern includes multiple lobes (beams), which allows the node that is forming the antenna pattern to communicate simultaneously with multiple other nodes. Therefore, a single node can broadcast synchronizing clock signal information to multiple non-reference nodes simultaneously. Therefore, the number of time slots required by some synchronization paths can be reduced, because multiple paths are simultaneously using a single time slot. Therefore, a synchronization routing path that has more hops than another synchronization routing path may actually require fewer time slots because nodes along the synchronization path are simultaneously forming multiple beams and broadcasting synchronizing clock signal information to multiple non-reference nodes during a single time slot.

At least some embodiments include selecting at least one of the synchronization paths between each non-reference node and one of the synchronization reference nodes based on a number of wireless hops of each of the identified synchronization paths and the determined number of timing slots needed to support each of the identified synchronization paths. These two selection parameters may be conflicting. For an embodiment, each parameter is weighted during the synchronization path selection process.

Figure 3:
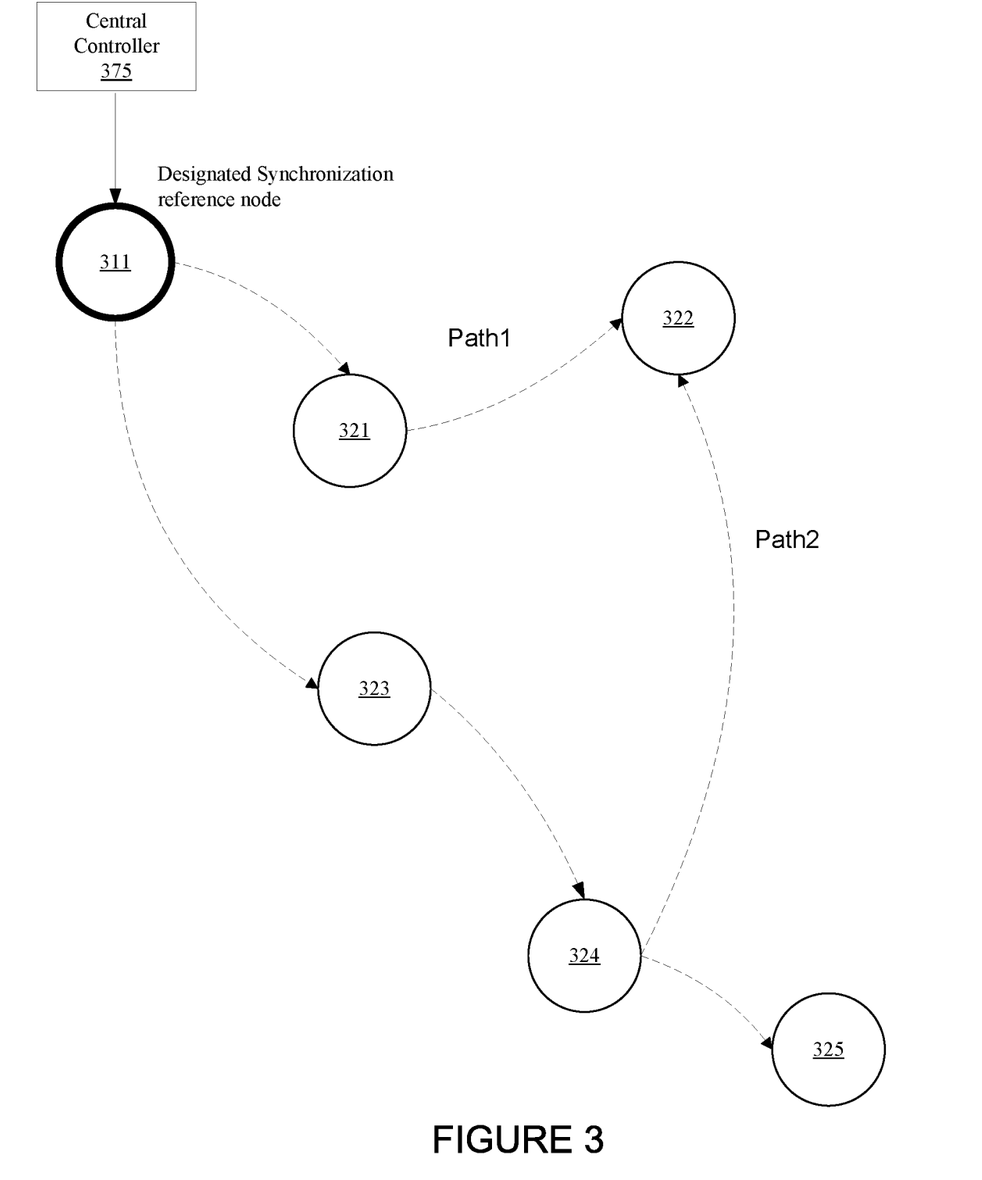
FIG. 3 shows a wireless mesh network, wherein a single synchronizing reference node is designated as the time reference for the rest of the wireless mesh network, according to an embodiment.

FIG. 3 shows a wireless mesh network, wherein a single synchronizing reference node 311 is designated as the time reference for the rest of the wireless mesh network, according to an embodiment. As shown, for an embodiment, a center controller 375 selects one of the nodes of at least a portion of the wireless network to be a synchronizing reference node. For an embodiment, an internal clock of the synchronizing reference node 311 operates as the timing reference for the rest of the nodes (non-reference nodes) 321, 322, 323, 324, 325 of the wireless mesh network.

Once designated, the synchronizing reference node 311 propagates the synchronization signal to the rest of the nodes (non-reference nodes) 321, 322, 323, 324, 325 of the wireless mesh network through the selected synchronization paths.

Figure 4:
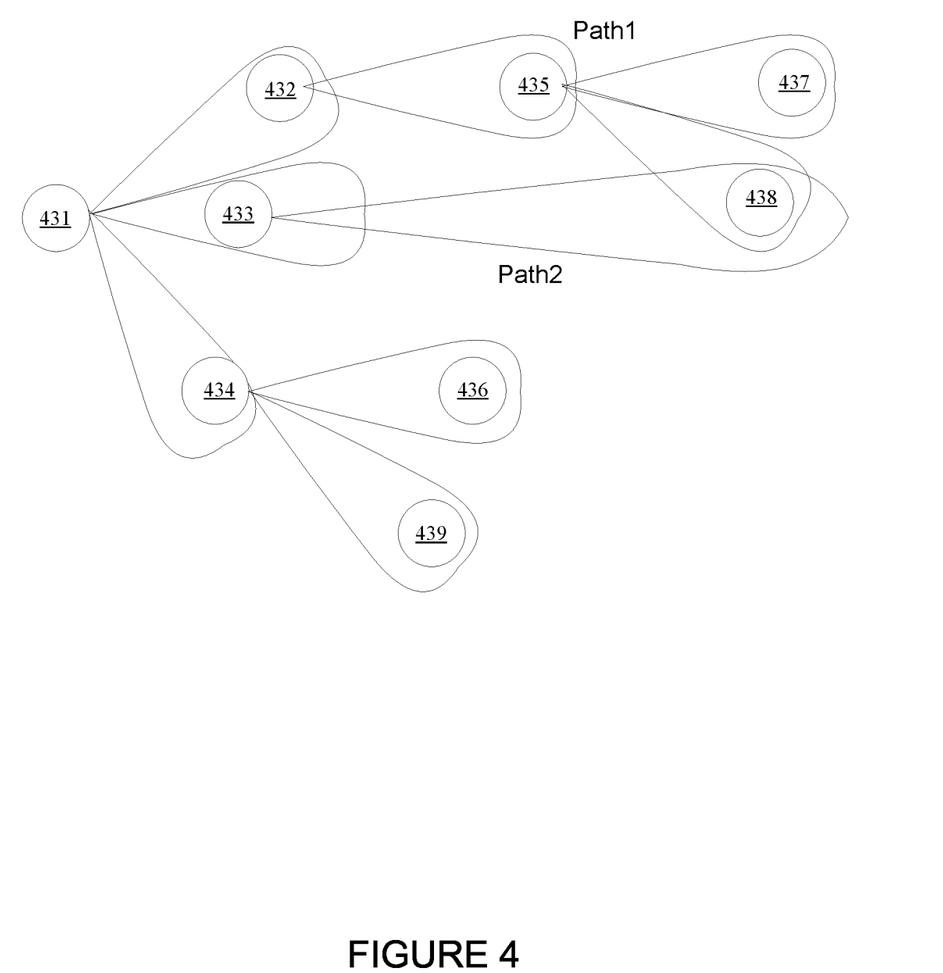
FIG. 4 shows nodes of the wireless network, beamforming patterns formed by the nodes, and possible time-synchronization routes of the wireless network, according to an embodiment.

FIG. 4 shows nodes of the wireless network, beamforming patterns formed by the nodes, and possible time-synchronization routes of the wireless network, according to an embodiment. As shown, one or more of the nodes includes an antenna array, and operates to form multiple antenna beams. For at least some embodiments, the multiple antenna beams allow the node having the antenna array to simultaneously communicate with multiple other nodes. For example, as shown in FIG. 4, synchronizing reference node 431 operates to form three beams allowing the synchronizing reference node 431 to simultaneously communicate with three non-reference nodes 432, 433, 434. For an embodiment, synchronizing reference node 431 operates to simultaneously communicate (broadcast) a synchronization signal to the non-reference nodes 432, 433, 434. The non-reference nodes 432, 433, 434 then time synchronize themselves to the synchronization signal, which causes the non-reference nodes 432, 433, 434 to be synchronized with the synchronizing reference node 431.

Further, as shown in FIG. 4, non-reference nodes 434, 435 include antenna arrays and operate to form multiple beams. Non-reference node 434 operates to form two beams, allowing the non-reference node 434 to simultaneously communicate (broadcast) the synchronization signal to non-reference nodes 436, 439. Non-reference node 435 operates to form two beams, allowing the non-reference node 435 to simultaneously communicate (broadcast) the synchronization signal to non-reference nodes 437, 438.

It is to be noted that the simultaneous broadcasting of the synchronization signal by at least some of the nodes of the wireless network through broadcast wireless links reduces the number of time slot required by synchronization paths that propagate through the broadcast links. For example, FIG. 4 shows a first synchronization path (Path1) in which a synchronization signal to communicated from the synchronizing reference node 431 to the non-reference node 432, to the non-reference node 435, and finally, to the non-reference node 438. Further, FIG. 4 also shows a second synchronization path (Path2) in which a synchronization signal to communicated from the synchronizing reference node 431 to the non-reference node 433, and finally, to the non-reference node 438. The simultaneous communicating (broadcasting) through the multiple beams reduces the number of time slots required by the synchronization paths that include the multiple beam broadcasting of the synchronization signal. Accordingly, the selections of the synchronization paths will be different for a network that includes nodes broadcasting the synchronization signal through multiple beams than for a network that does not include broadcasting of the synchronization signal through multiple beams.

Figure 5:
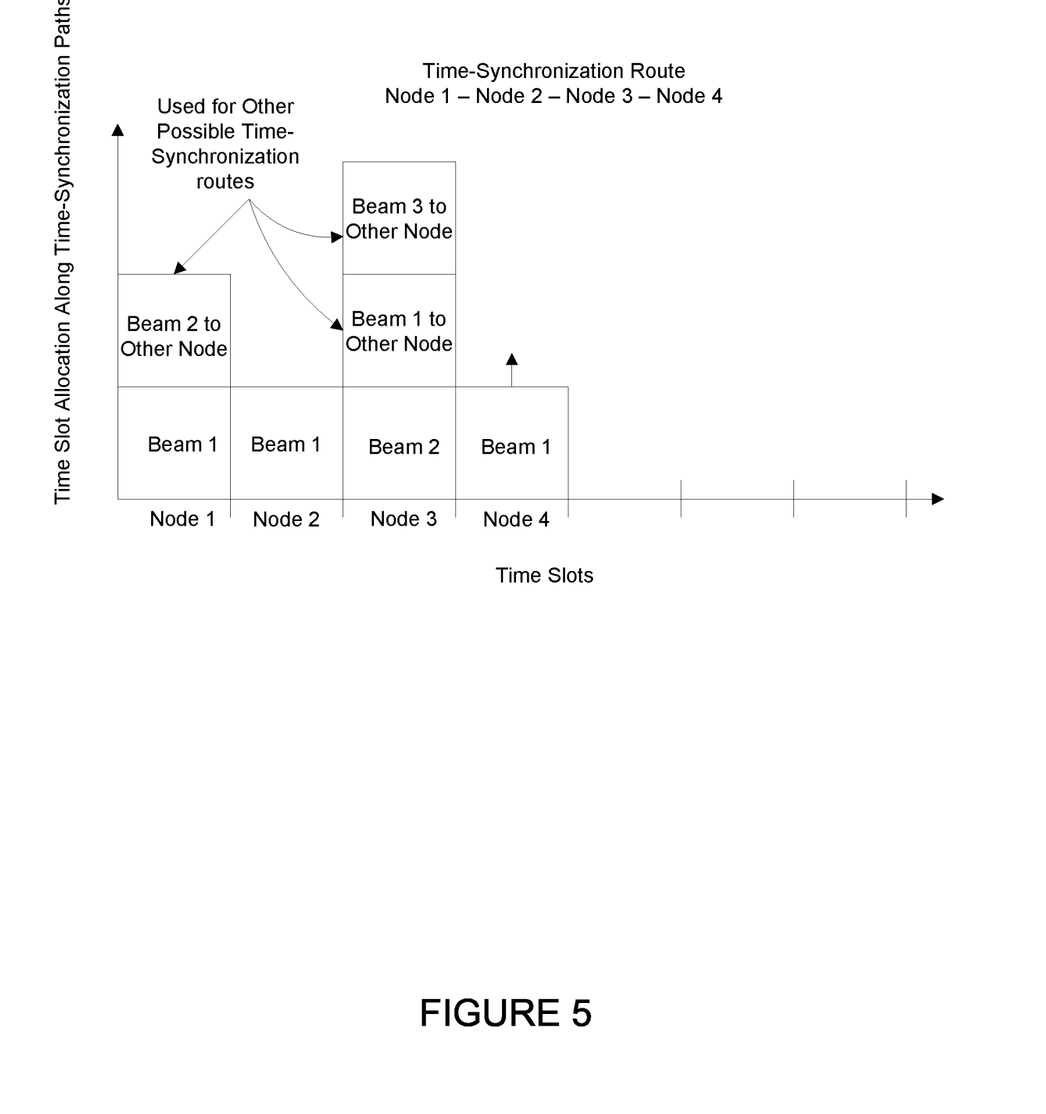
FIG. 5 shows possible time-slot allocations of wireless communications of nodes of the wireless network, according to an embodiment.

FIG. 5 shows possible time-slot allocations of wireless communications of nodes of the wireless network, according to an embodiment. For this example, a first synchronization path may include a first node (node 1), a second node (node 2), and third node (node 3), and a fourth node (node 4). Accordingly, the synchronization signal is broadcast from the first node (node 1), to the second node (node 2), to the third node (node 3), and finally, to the fourth node (node 4) through a second beam of the third node (node 3). However, as depicted by the time-line of FIG. 4, the first node (node 1) also simultaneously broadcasts the synchronization signal to another node through a second beam, and the third node (node 3) also simultaneously broadcasts the synchronization signal to other nodes through a first beam and through a third beam.

Figure 6:
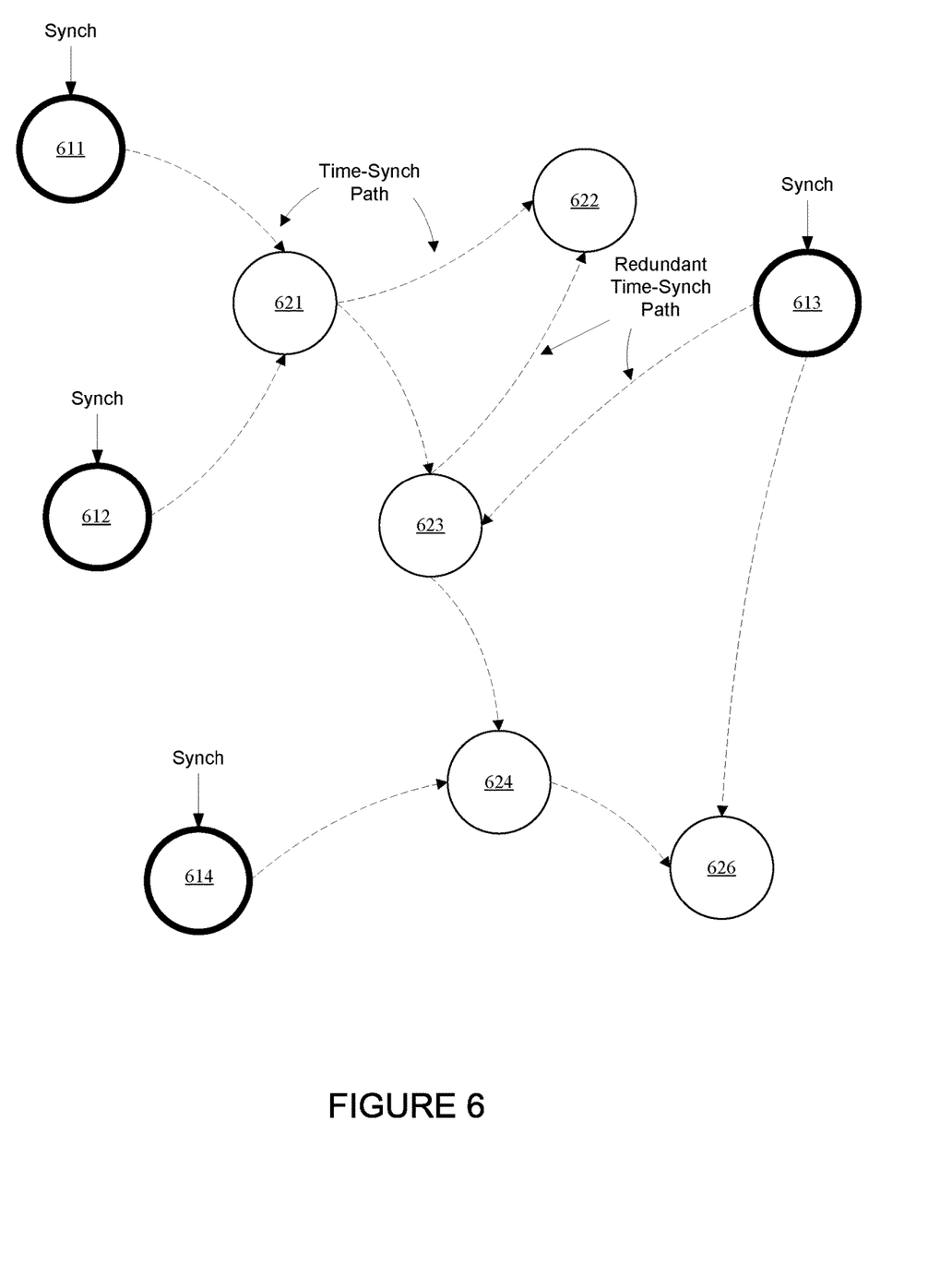
FIG. 6 shows a wireless mesh network, wherein redundant time-synchronization paths have been selected, according to an embodiment.

FIG. 6 shows a wireless mesh network, wherein redundant time-synchronization paths have been selected, according to an embodiment. For at least some embodiments, selecting at least one of the synchronization paths between each non-reference node and one or more synchronization reference nodes is further based on selecting a redundant number of synchronization paths between each non-reference node and the one or more synchronization reference nodes. Redundant synchronization paths can be selected to aid the network in maintaining synchronization if a synchronization path fails. That is, if a synchronization path fails, a redundant synchronization path is utilized to provide the synchronization signal to non-references nodes that were dependent on the failed synchronization path.

For an embodiment, the redundant path may be less optimal than the initially selected or primary synchronization path. However, the selection of the redundant or secondary path is made in case the initial or primary path fails.

For optimal redundancy, the redundant or secondary synchronization path does not share any wireless links or wireless hop with the primary synchronization path.

FIG. 6 shows redundant synchronization paths. For example, a first synchronization path to a node 622 may include a path from a synchronization reference node 611 through a non-reference node 621 and then to the node 622, and a second synchronization path to the node 622 may include a path from a synchronization reference node 613 through a non-reference node 623 and then to the node 622. If one of the wireless links of the first synchronization path fails, the node 622 can still receive the synchronization signal through the second synchronization path. As previously described, for an embodiment, the redundant or secondary synchronization path does not include any common wireless links or wireless hops as the primary synchronization path.

Figure 7:
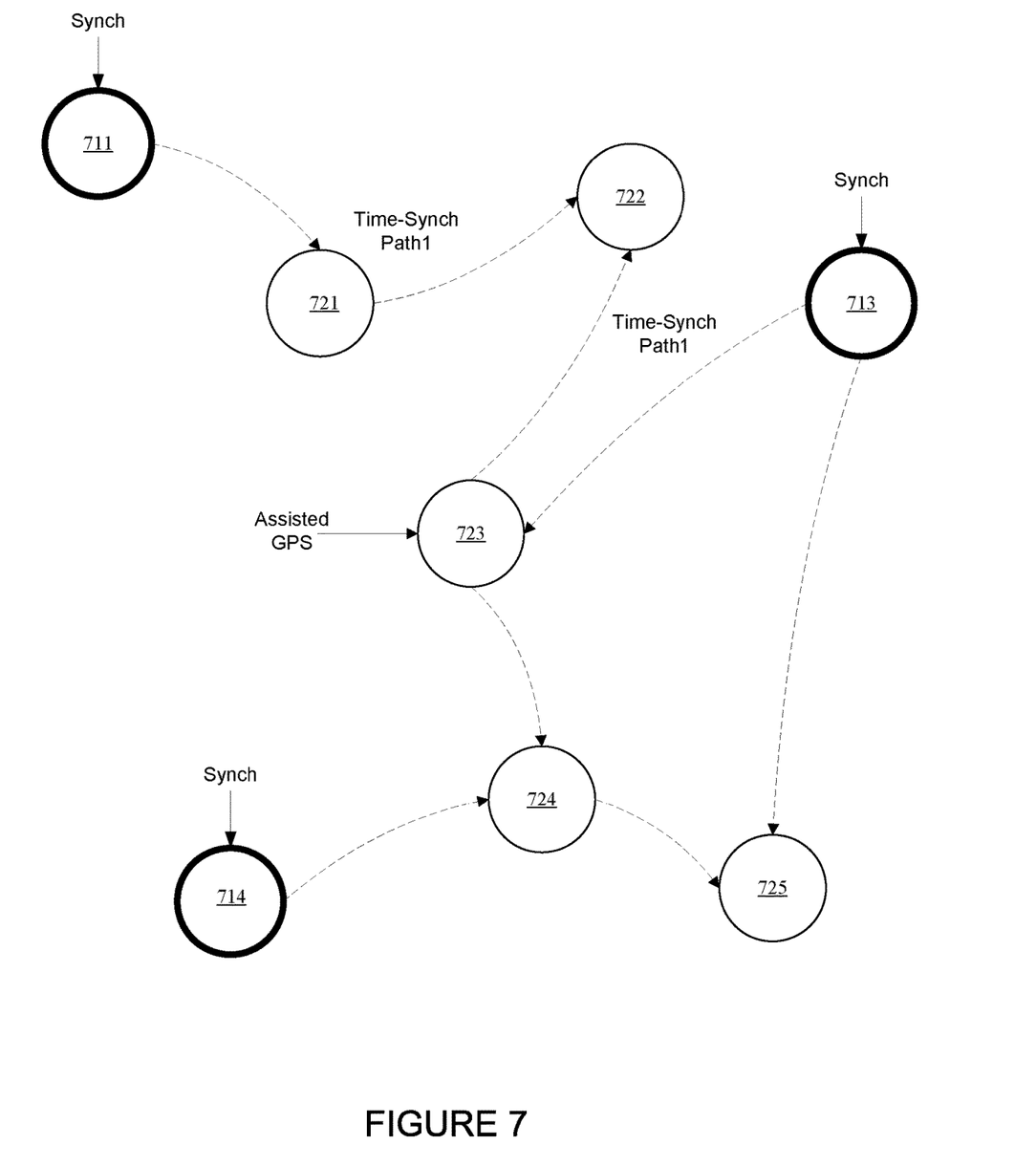
FIG. 7 shows a wireless mesh network, wherein synchronization errors of time-synchronization paths are accounted for the selection of the time-synchronization paths, according to an embodiment.

FIG. 7 shows a wireless mesh network, wherein synchronization errors of time-synchronization paths are accounted for the selection of the time-synchronization paths, according to an embodiment. Generally, synchronization errors add with each wireless hop along a synchronization path. Therefore, minimization of synchronization errors is typically consistent with minimizing the number of wireless hops along the synchronization paths. However, at least some nodes may be aided with at least a compromised synchronization signal. For example, a node (non-reference node 723 along a path may at least partially receive a GPS signal that does not allow the node to obtain synchronization, but may be enough to aid synchronization. For an embodiment, the non-reference node 723 may be assisted by a GPS signal which may be used to mitigate synchronization errors introduces by the non-reference nodes along the synchronization path.

Figure 9:
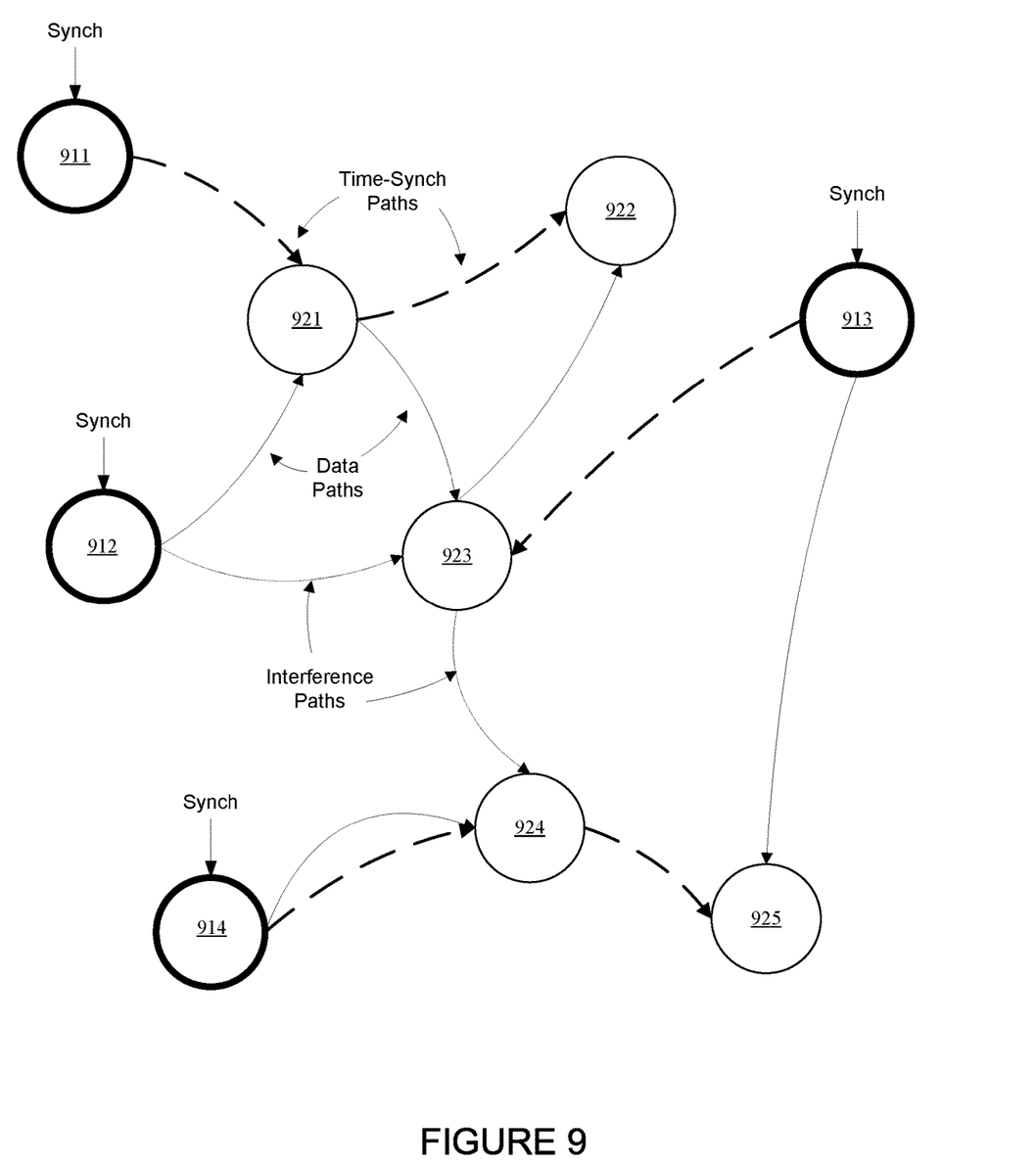
FIG. 9 shows a wireless mesh network that includes data routing paths that are different than time-synchronization paths of the wireless mesh network, according to an embodiment.

For an embodiment, selecting at least one of the synchronization paths between each non-reference node 721, 722, 723, 724, 725 and one of the synchronization reference nodes 711, 713, 714 is further based on maintaining synchronization errors between the synchronization reference nodes and the non-reference node of a local region within a selected threshold. The local region can be defined by one of several different ways. For an embodiment, the local region is identified based on levels of interference (such as, INR (interference to noise ratio) based on antenna patterns of the synchronization reference nodes and the non-reference nodes, or INR as determined through runtime measurements) such as depicted in FIG. 9. That is, for an embodiment, the local region is based on levels of interference based on interference measurements (for example, runtime measurements) between the synchronization reference nodes and the non-reference nodes. For an embodiment, the antenna patterns are used for identifying interference between nodes. For at least some other embodiments, the local regions are additionally or alternatively defined by spatial proximity of the wireless nodes and/or by a received signal strength between the nodes.

Figure 8:
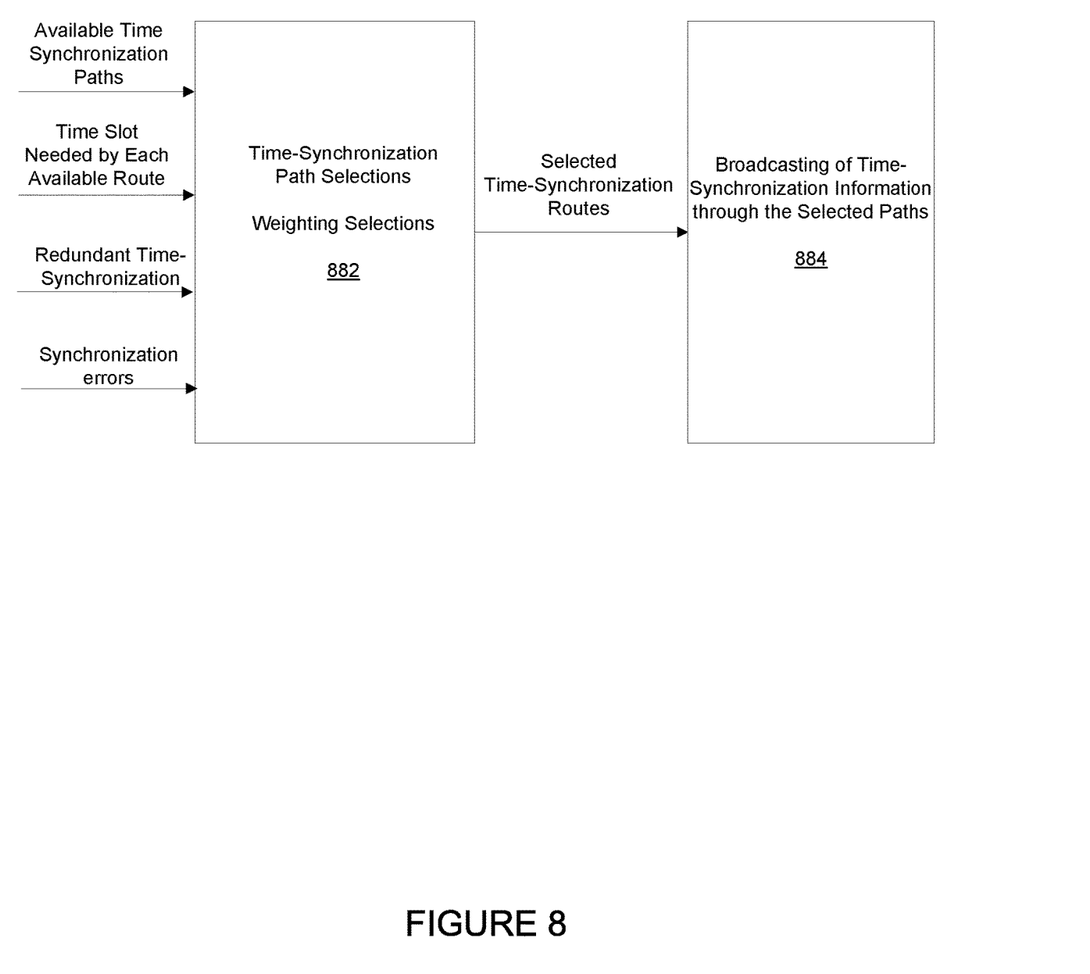
FIG. 8 shows a block diagram of functionally selecting time-synchronization paths of the wireless network, according to an embodiment.

FIG. 8 shows a block diagram of functionally selecting time-synchronization paths of the wireless network, according to an embodiment. As shown, a time-synchronization processing block 882 may select synchronization paths through a wireless mesh network based on one or more path selection factors, such as, based on the available synchronization paths, the number of time slot required to support the synchronization paths, the desire for redundant synchronization paths, and based on synchronization errors of the selected synchronization paths. For an embodiment, each of the factors has a weighted influence on the synchronization path selection. Further, for an embodiment, the weighting is adaptively selected.

An embodiment includes sensing or detecting co-channel interference between nodes of the wireless mesh network. For an embodiment, the weighting of the number of time slots is adaptively adjusted (increased) so as to reduce co-channel interference when the co-channel interference is sensed or detected to be greater than an acceptable threshold.

An embodiment includes sensing or detecting synchronization failures of nodes within the wireless mesh network. For an embodiment, the weighting for redundant synchronization paths is adjusted (increased) when the number of sensed or detected synchronization failures of nodes is determined to be greater than an acceptable threshold.

An embodiment includes sensing or detecting a level of synchronization errors. For an embodiment, the weighting of the synchronization errors is adjusted (increased) based on a configured guard time when the wireless mesh network is operating as a TDD (time division duplex) network. FIG. 9 shows a wireless mesh network that includes data routing paths that are different than time-synchronization paths of the wireless mesh network, according to an embodiment. For at least some embodiments, the selected synchronization paths of the wireless mesh network are different than data path of the wireless mesh network. That is, the selection process for selecting synchronization paths between the synchronization reference nodes 911, 912, 913, 914 and the non-reference nodes 921, 922, 923, 924, 925 through the wireless mesh network can be different than the selection process for selecting data paths through the wireless mesh network. For example, a data path may require wireless links that provide a better (higher) SNR of signal propagating through the wireless links. Accordingly, a wireless link (of a wireless hop) through a synchronization path may be of a quality that is too poor to be a wireless link of a data path.

FIG. 9 additionally shows interference paths. These are not selected paths, but paths of interferences that can occur based on the selected synchronization paths. It is to be understood that interference paths can influence the path selections.

Figure 10:
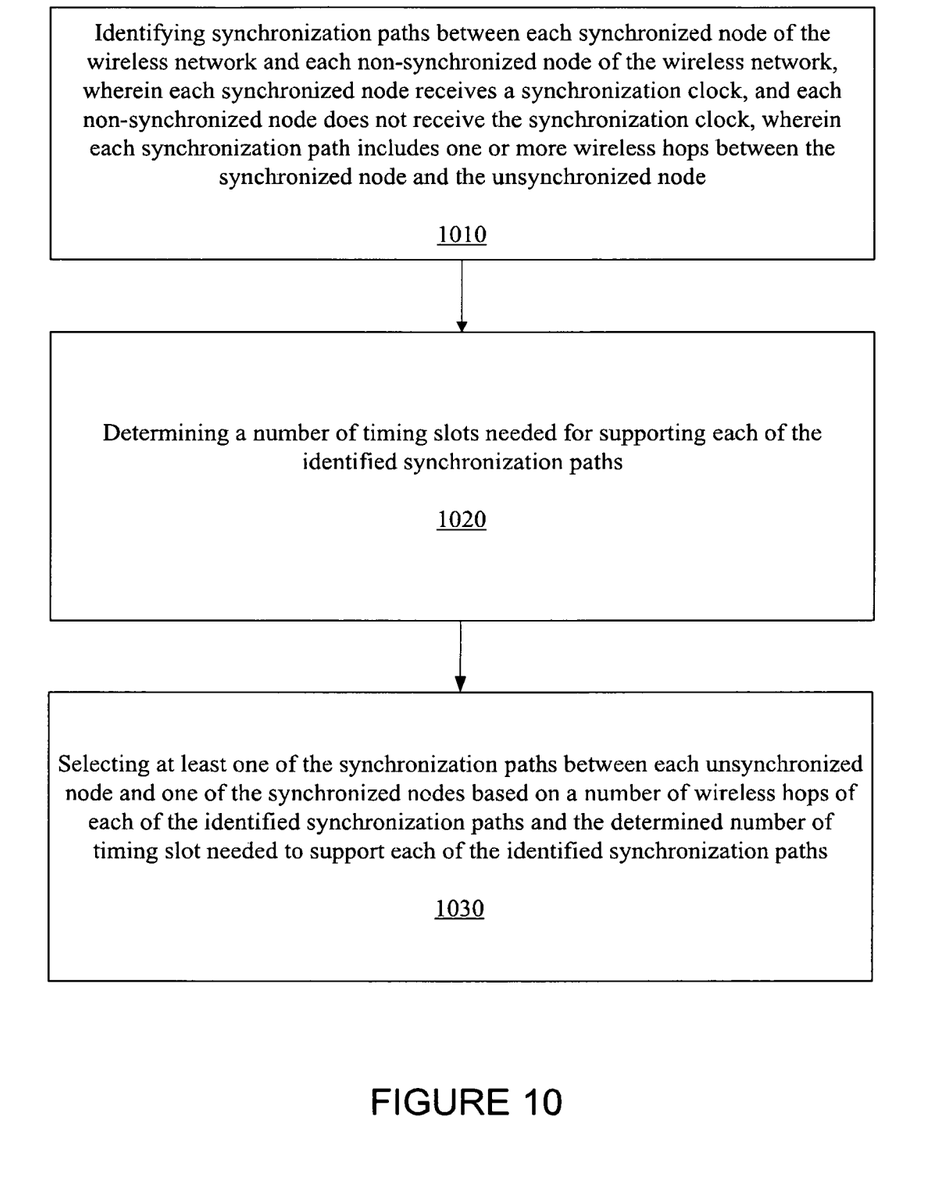
FIG. 10 shows a flow chart that includes steps of a method of time-synchronization of nodes of a wireless network, according to an embodiment.

FIG. 10 shows a flow chart that includes steps of a method of time-synchronization of nodes of a wireless network, according to an embodiment. A first step 1010 includes identifying synchronization paths between one or more synchronization reference nodes of the wireless network and each non-reference node of the wireless network, wherein each synchronization reference node receives a synchronization signal or is designated as a source of the synchronization signal, and each non-reference node does not directly receive the synchronization signal and is not designated as a source of the synchronization signal, wherein each synchronization path includes one or more wireless hops between the one or more synchronization reference nodes and the non-reference node. A second step 1020 includes determining a number of timing slots needed for supporting each of the identified synchronization paths. A third step 1030 includes selecting at least one of the synchronization paths between each non-reference node and at least one of the synchronization reference nodes based on a number of wireless hops of each of the identified synchronization paths and the determined number of timing slots needed to support each of the identified synchronization paths.

At least some embodiments further include the one or more synchronization reference nodes communicating a synchronization signal to each of the non-reference node through the selected at least one of the synchronization paths. As described, first the synchronization paths are selected based on the selecting parameters, and then the synchronization signal is communicated through the nodes of the wireless mesh network using the selected synchronization paths.

For at least some embodiments, selecting at least one of the synchronization paths between each non-reference node and one or more synchronization reference nodes is further based on selecting a redundant number of synchronization paths between each non-reference node and the one or more synchronization reference nodes. As described, the selection of redundant synchronization paths enables continuous synchronization if a wireless link or wireless hop along a primary or first selected synchronization path fails.

As previously described, for at least some embodiments, at least one of the selected at least one of the synchronization paths between each non-reference node and one of the synchronization reference nodes is different than a data path to the non-reference nodes. The selection parameters used for synchronization paths can be different than the selection parameters of data paths.

For at least some embodiments, at least one of the synchronization reference nodes or at least one intervening non-reference node includes an antenna array that forms a beamforming pattern having multiple lobes. At least some embodiments, further include the at least one of the synchronization reference nodes or intervening non-reference node that includes that antenna array that forms the beamforming pattern having multiple lobes broadcasting a synchronization signal to non-reference nodes through the multiple lobes. An intervening non-references node is a non-reference node that is including within a synchronization path between a synchronization node and another non-reference node.

For at least some embodiments, selecting at least one of the synchronization paths between each non-reference node and one of the synchronization reference nodes is further based on maintaining synchronization errors between the synchronization reference nodes and the non-reference node within a selected threshold.

For at least some embodiments, the selected threshold of the synchronization errors is selected based on how much synchronization error is tolerable in order for the nodes of the wireless mesh network to properly communicate with each other. That is, if the propagation error becomes too large, some of the wireless nodes may not able to communicated due to the timing offset between wireless nodes.

As previously described, for at least some embodiments, selecting at least one of the synchronization paths between each non-reference node and one of the synchronization reference nodes is further based on maintaining synchronization errors between the synchronization reference nodes and the non-reference node of a local region within a selected threshold. For an embodiment, the local region is identified based on levels of interference (such as, INR (interference to noise ratio) based on antenna patterns of the synchronization reference nodes and the non-reference nodes. For at least some other embodiments, the local regions are additionally or alternatively defined by spatial proximity of the wireless nodes and/or by a received signal strength between the nodes. For an embodiment, the local region is based on levels of interference based on interference measurements (for example, runtime measurements) between the synchronization reference nodes and the non-reference nodes.

Figure 11:
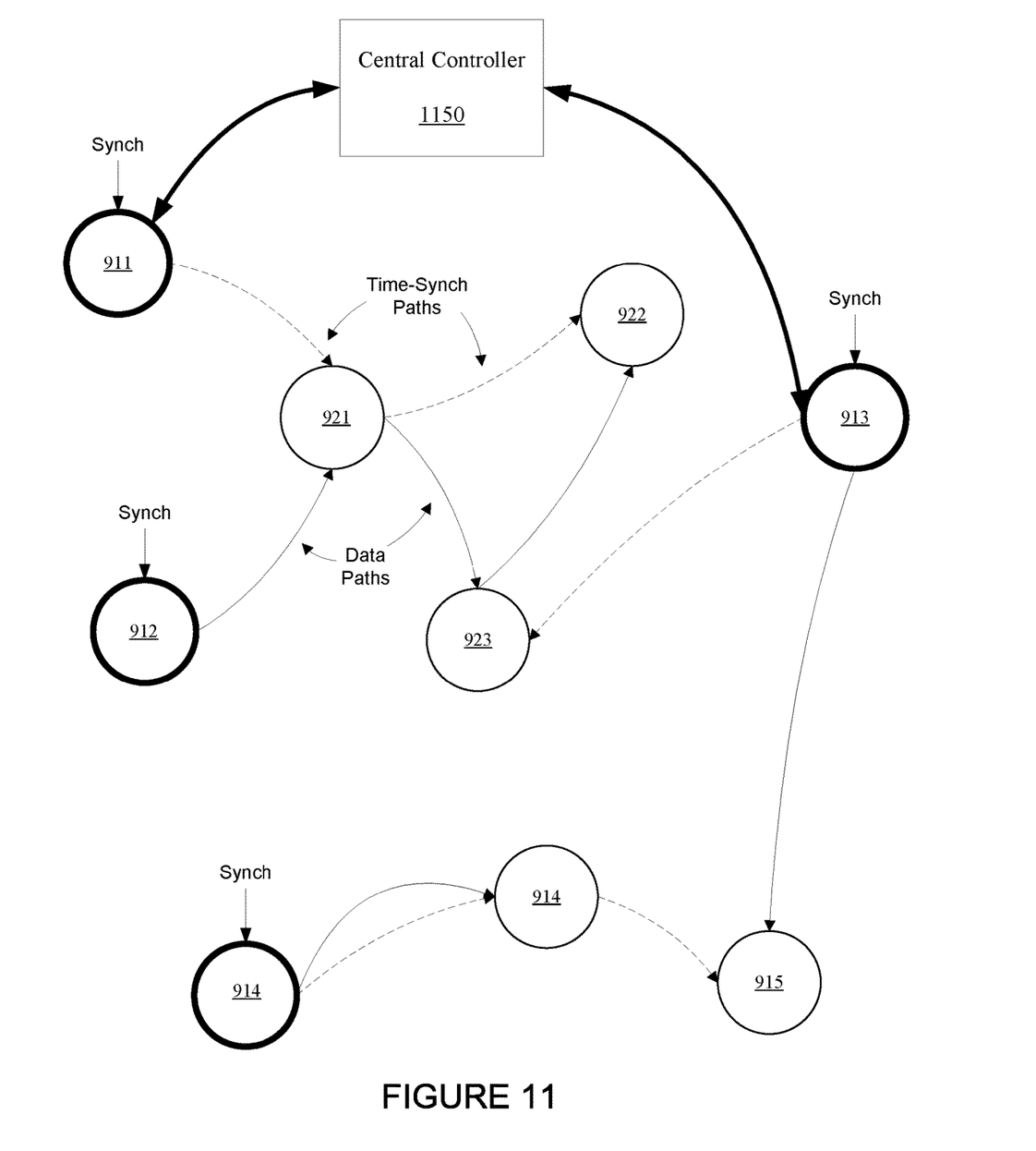
FIG. 11 shows a wireless mesh network that includes a central controller, according to an embodiment.

FIG. 11 shows a wireless mesh network that includes a central controller 1150, according to an embodiment. For at least some embodiments the central controller 1150 performs the selection of the synchronization paths through the wireless mesh network based on one or more of the desired selection parameters. Further, for at least some embodiments, the central controller 1150 adaptively adjusts the weighting of the desired selection parameters.

For at least some embodiments, at least one of the synchronization reference nodes and the non-reference nodes characterize beamforming patterns between the synchronization reference nodes and the non-reference nodes, and wherein a central network controller (such as, the central controller 1150) performs the selecting at least one of the synchronization paths between each non-reference nodes and one of the synchronization reference nodes additionally based on the characterized beamforming patterns.

Although specific embodiments have been described and illustrated, the embodiments are not to be limited to the specific forms or arrangements of parts so described and illustrated. The described embodiments are to only be limited by the claims.

What is claimed:

1. A method of synchronizing nodes of a wireless network, comprising:
   identifying synchronization paths between one or more synchronization reference nodes of the wireless network and each non-reference node of the wireless network, wherein each synchronization reference node receives a synchronization signal or is designated as a source of the synchronization signal, and each non-reference node does not directly receive the synchronization signal and is not designated as a source of the synchronization signal, wherein each synchronization path includes one or more wireless hops between the one or more synchronization reference nodes and the non-reference node;
   determining a number of timing slots needed for supporting each of the identified synchronization paths; and
   selecting at least one of the synchronization paths between each non-reference node and at least one of the synchronization reference nodes based on a number of wireless hops of each of the identified synchronization paths and the determined number of timing slots needed to support each of the identified synchronization paths;
   wherein at least one of the synchronization reference nodes or at least one intervening non-reference node includes an antenna array that forms a beamforming pattern having multiple beams.

2. The method of claim 1, further comprising the one or more synchronization reference nodes communicating the synchronization signal to each of the non-reference node through the selected at least one of the synchronization paths.

3. The method of claim 1, wherein selecting at least one of the synchronization paths between each non-reference node and one or more synchronization reference nodes is further based on selecting a redundant number of synchronization paths between each non-reference node and the one or more synchronization reference nodes.

4. The method of claim 1, wherein at least one of the selected at least one of the synchronization paths between each non-reference node and one of the synchronization reference nodes is different than a data path to the non-reference node.

5. The method of claim 1, further comprising the at least one of the synchronization reference nodes or at least one intervening non-reference node that includes that antenna array that forms the beamforming pattern having multiple beams broadcasting a synchronization signal to non-reference nodes through the multiple beams.

6. The method of claim 1, wherein selecting at least one of the synchronization paths between each non-reference node and one of the synchronization reference nodes is further based on maintaining synchronization errors between the synchronization reference nodes and the non-reference node within a selected threshold.

7. The method of claim 1, wherein selecting at least one of the synchronization paths between each non-reference node and one of the synchronization reference nodes is further based on maintaining synchronization errors between the synchronization reference nodes and the non-reference node of a local region within a selected threshold.

8. The method of claim 7, wherein the local region is based on levels of interference based on antenna patterns of the synchronization reference nodes and the non-reference nodes.

9. The method of claim 1, further comprising at least one of the synchronization reference nodes and the non-reference nodes characterizing beamforming patterns between the synchronization reference nodes and the non-reference nodes, and wherein a central network controller performs the selecting at least one of the synchronization paths between each non-reference nodes and at least one of the synchronization reference nodes additionally based on the characterized beamforming patterns.

10. A wireless network, comprising:
a plurality of synchronization reference nodes;
a plurality of non-reference nodes;
a controller, wherein the controller operates to:
identify synchronization paths between one or more synchronization reference nodes of the wireless network and each non-reference node of the wireless network, wherein each synchronization reference node receives a synchronization signal or is designated as a source of the synchronization signal, and each non-reference node does not directly receive the synchronization signal and is not designated as a source of the synchronization signal, wherein each synchronization path includes one or more wireless hops between the synchronization reference nodes and the non-reference node;
determine a number of timing slots needed for supporting each of the identified synchronization paths; and
select at least one of the synchronization paths between each non-reference node and at least one of the synchronization reference nodes based on a number of wireless hops of each of the identified synchronization paths and the determined number of timing slots needed to support each of the identified synchronization paths;
wherein at least one of the synchronization reference nodes or at least one intervening non-reference node includes an antenna array that forms a beamforming pattern having multiple beams.

11. The wireless network of claim 10, wherein one or more synchronization reference nodes communicate a synchronization signal to each of the non-reference node through the selected at least one of the synchronization paths.

12. The wireless network of claim 10, wherein selecting at least one of the synchronization paths between each non-reference node and one of the synchronization reference nodes is further based on selecting a redundant number of synchronization paths between each non-reference node and one or more of the synchronization reference nodes.

13. The wireless network of claim 10, wherein at least one of the selected at least one of the synchronization paths between each non-reference node and one of the synchronization reference nodes is different than a data path to the non-reference nodes.

14. The wireless network of claim 10, wherein the at least one of the synchronization reference nodes or the intervening non-reference nodes that includes that antenna array that forms the beamforming pattern having multiple lobes broadcasting a synchronization signal to non-reference nodes through the multiple beams.

15. The wireless network of claim 10, wherein selecting at least one of the synchronization paths between each non-reference node and one of the synchronization reference nodes is further based on maintaining synchronization errors between the synchronization reference nodes and the non-reference node within a selected threshold.

16. The wireless network of claim 10, wherein selecting at least one of the synchronization paths between each non-reference node and one of the synchronization reference nodes is further based on maintaining synchronization errors between the synchronization reference nodes and the non-reference node of a local region within a selected threshold.

17. The wireless network of claim 16, wherein the local region is based on levels of interference based on antenna patterns of the synchronization reference nodes and the non-reference nodes.

18. The wireless network of claim 16, wherein the local region is based on levels of interference based on interference measurements between the synchronization reference nodes and the non-reference nodes.

* * * * *